United States Patent [19]

Osajda

[11] Patent Number: 5,734,159

[45] Date of Patent: Mar. 31, 1998

[54] ROTATION SENSOR USING A RADIATION EMITTER AND DETECTOR AND A DUTY CYCLE FEEDBACK LOOP

[75] Inventor: Marc Osajda, Toulouse, France

[73] Assignee: Motorola, Inc., Schaumburg, Ill.

[21] Appl. No.: 648,167

[22] PCT Filed: Oct. 4, 1995

[86] PCT No.: PCT/EP95/03941

§ 371 Date: Jun. 29, 1996

§ 102(e) Date: Jun. 29, 1996

[87] PCT Pub. No.: WO96/11407

PCT Pub. Date: Apr. 18, 1996

[30] Foreign Application Priority Data

Oct. 5, 1994 [GB] United Kingdom ............... 9420076

[51] Int. Cl.⁶ .................... G01D 5/34; H01J 40/14
[52] U.S. Cl. ...................... 250/231.13; 324/175
[58] Field of Search ............. 250/231.13, 231.14; 341/11, 13, 14; 324/173, 174, 175

[56] References Cited

U.S. PATENT DOCUMENTS 4,387,374 6/1983 Wiener ................. 250/231.14
4,475,086 10/1984 Allen ........................ 327/175
4,965,445 10/1990 Ikeuchi et al. ........... 250/231.13

OTHER PUBLICATIONS

I.B.M. Technical Disclosure Bulletin, vol. 17, No. 2, Jul. 1974, Digital Optical Tachometer, Richards et al, pp. 351–358.

Primary Examiner—Edward P. Westin
Assistant Examiner—Kevin Pyo
Attorney, Agent, or Firm—Robert F. Hightower; Rennie William Dover

[57] ABSTRACT

A rotation sensor (5) comprises a fixed member (10) and a rotatable member (20). The fixed member (10) contains a radiation emitter (40) which emits radiation along a path (35). The rotatable member (20) rotates about an axis (65) substantially perpendicular to the path (35) and has a head containing slots (25) arranged to periodically transmit and block the radiation emitted by the emitter (40). The fixed member (210) also has a radiation detector (50) which detects radiation transmitted by the slots (25) of the rotatable member (20). Thus, the rotational movement of the rotatable member (20) with respect to the fixed member (10) is sensed by the frequency of the radiation detected by the radiation detector (50).

6 Claims, 3 Drawing Sheets

ROTATION SENSOR USING A RADIATION EMITTER AND DETECTOR AND A DUTY CYCLE FEEDBACK LOOP

FIELD OF THE INVENTION

This invention relates to rotation sensors and particularly but not exclusively to optoelectronic rotation sensors.

BACKGROUND OF THE INVENTION

A conventional method for sensing vehicle speed involves a flexible cable linking an axle or other moving element of the vehicle to a measurement device such as a speedometer.

A known alternative to the above method is a device comprising a Hall effect sensor in combination with a moving magnet. The magnet may be connected to the moving element of the vehicle, and the sensors to a fixed element of the vehicle in close proximity to the magnet, such that rotation of the magnet gives rise to an induced current in the sensors, which can be transmitted as electrical signals to the measurement device.

A problem with this arrangement is that the separation between north and south poles and magnetic field variations due to ambient temperature give rise to inaccurate and unstable transmitted signals.

Additionally, the mass of the magnet gives rise to a significant moment of inertia when rotating, which produces vibrations and leads to excessive wear of the device.

Furthermore, it is necessary to maintain a constant distance between the magnet and the sensor. Any variation in distance leads to further inaccuracies in the signals.

This invention seeks to provide a rotation sensor which mitigates the above mentioned disadvantages.

SUMMARY OF THE INVENTION

According to the present invention there is provided a rotation sensor comprising a fixed member; a radiation emitter disposed on the fixed member for emitting radiation along a path; a rotatable member arranged to rotate about an axis substantially perpendicular to the path and comprising a head having slots therein arranged in the path for periodically transmitting and blocking, in use, the radiation emitted by the emitter; and a radiation detector disposed on the fixed member for detecting radiation transmitted by the rotatable member; wherein rotational movement of the rotatable member with respect to the fixed member is sensed by the frequency of the radiation detected by the radiation detector.

The fixed member preferably further comprises an electronic circuit coupled to send and receive electrical signals to and from the emitter and the sensor respectively. Preferably the electronic circuit includes a duty cycle feedback loop.

The duty cycle feedback loop is preferably selectively coupled to the sensor, such that for large rotations of the rotatable member the loop is coupled to the sensor and for small rotations of the rotatable member, the loop is not coupled to the sensor.

Preferably the electronic circuit further comprises an output terminal for providing signals indicating the speed of rotation of the rotatable member. The radiation emitter is preferably a light emitting diode.

Preferably the fixed member further comprises a saddle enclosing the radiation emitter, the radiation sensor, the path and the head of the rotatable member.

In this way problems of inaccurate and unstable transmitted signals and vibrations leading to excessive wear associated with Hall effect sensors are reduced.

BRIEF DESCRIPTION OF THE DRAWINGS

An exemplary embodiment of the invention will now be described with reference to the drawing in which.

DETAILED DESCRIPTION OF A PREFERRED EMBODIMENT

Figure 1:
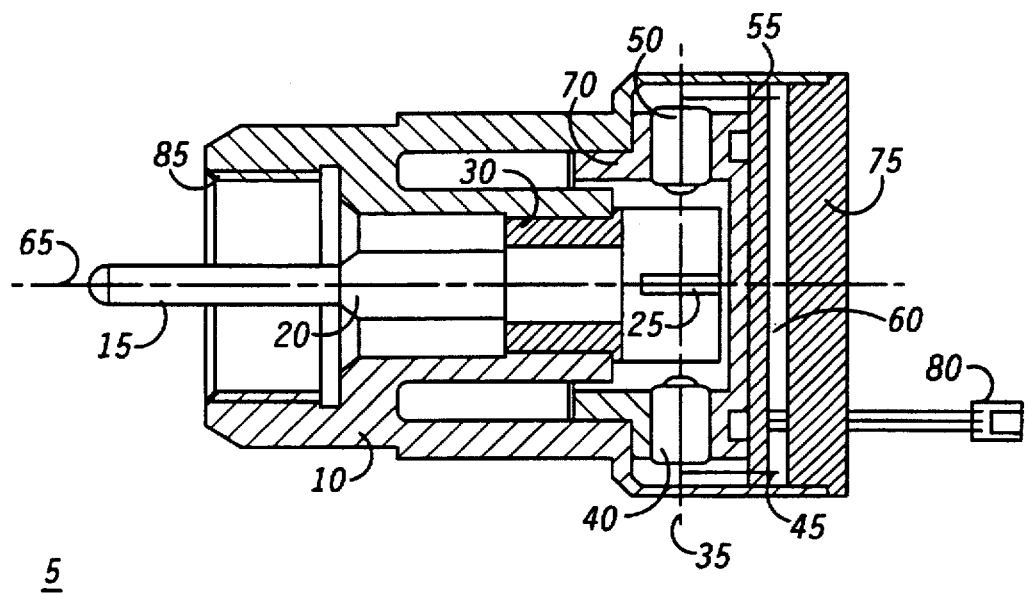
FIG. 1 shows a preferred embodiment of a rotation sensor in accordance with the invention.

Referring to FIG. 1, there is shown a rotation sensor 5 comprising a housing 10 and a rotatable shaft 20. The housing 10 is a single piece of moulded material, such as strengthened plastic material, and further comprises a saddle 70.

A Gallium Arsenide Light Emitting Diode (LED) 40 is disposed within the saddle 70 and has a connection 45 to a circuit 60 to be further described below. The LED 40 is arranged to emit radiation along a radiation path 35.

A silicon radiation sensor 50, suitable for detecting the radiation emitted from the LED 40 is also disposed within the saddle 70, at a position along the radiation path 35 substantially facing the LED 40. The radiation sensor 50 is thus arranged to receive and detect the radiation emitted along the radiation path 35. The radiation detector 50 has a connection 55 to the circuit 60 to be further described below.

The rotatable shaft 20 is partially enclosed in the housing and arranged to rotate about an axis 65, which is perpendicular to the radiation path 35. A metal collar 30 is located between an aperture of the saddle 70 and the rotatable shaft 20. In this way the metal collar 30 provides a seal for the saddle, reduces friction and maintains a substantially constant relative position between the rotatable shaft 20 and the saddle 70.

The circuit 60 is also located in the housing 10. A cover 75 protects the circuit 60 and seals the housing 10.

The rotatable shaft 20 further comprises a head containing a number of slots 25. The rotatable shaft 20 is arranged such that the head is located on the radiation path 35 between the LED 40 and the radiation detector 50. A square axle 15 of the rotatable shaft 20 is located at an end remote from the head, for connection to an external drive shaft of a vehicle (not shown). A threaded hole 85 on the housing 10 is used to secure the rotation sensor 5 to a fixed body such as a drive shaft housing of a vehicle (not shown).

Figure 2:
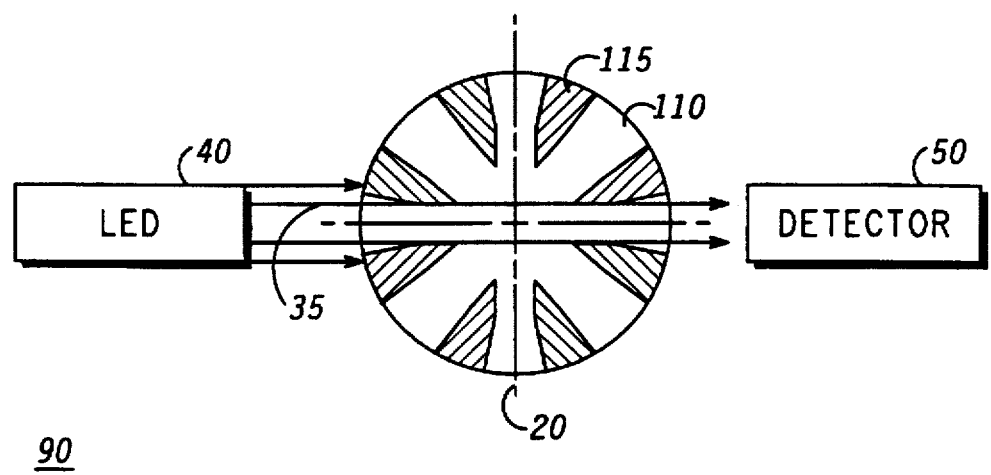
FIGS. 2, 3 and 4 show in detail an end view of a rotatable member forming part of the preferred embodiment of FIG. 1.

Referring also to FIG. 2, a transmission configuration 90 shows the head of the rotatable shaft 20 located in the radiation path 35 between the LED 40 and the radiation detector 50. The slots 25 are formed by radial apertures 110 and radial wedges 115 extending towards but not reaching the centre of the rotatable shaft 20. The configuration 90 allows maximum radiation transmission from the LED 40 to the radiation detector 50, without erroneous crosstalk transmitted via neighbouring slots.

Figure 3:
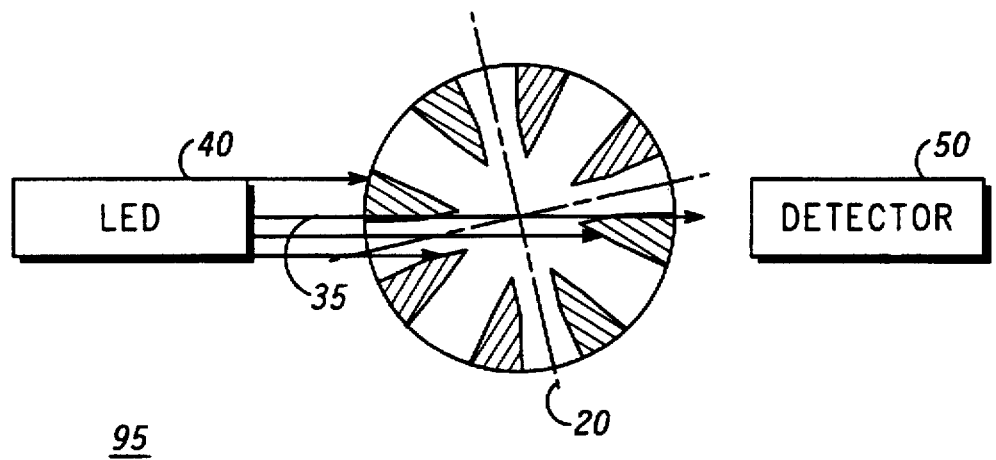

Referring also to FIG. 3, a limit configuration 95 shows the head of the rotatable shaft 20 rotated with respect to the transmission configuration 90 to a position at the limit of transmission, where the radiation transmitted by the LED 40 is almost completely blocked by the rotatable shaft 20, by virtue of the radial wedges 115.

Figure 4:
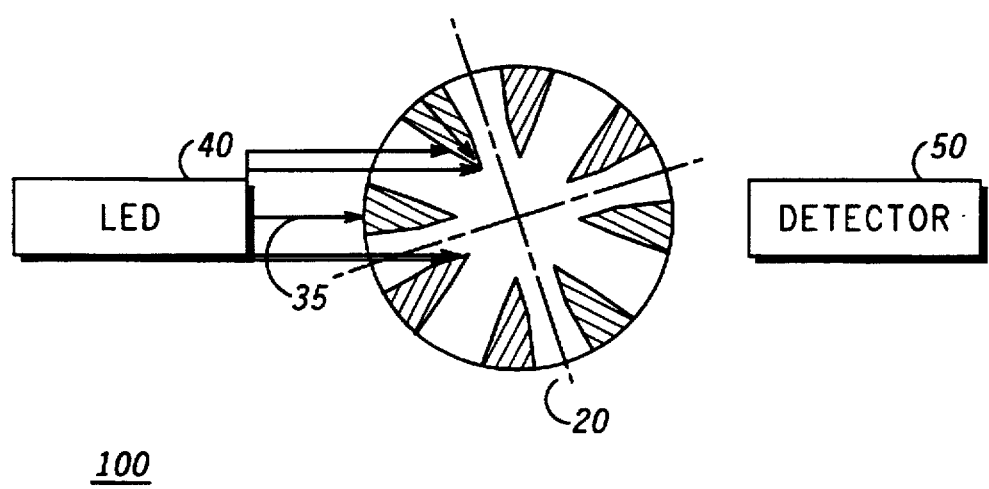

Referring also to FIG. 4, a blocked configuration 100 shows the head of the rotatable shaft 20 further rotated with respect to the transmission configuration, such that the radial wedges 115 of the rotatable shaft 20 completely block the radiation path 35. The transmitted radiation is completely blocked, and cannot reach the radiation detector 50. The possibility of crosstalk between two non-aligned slots is eliminated because the radial wedges 115 extend towards the centre of the rotatable shaft 20.

Figure 5:
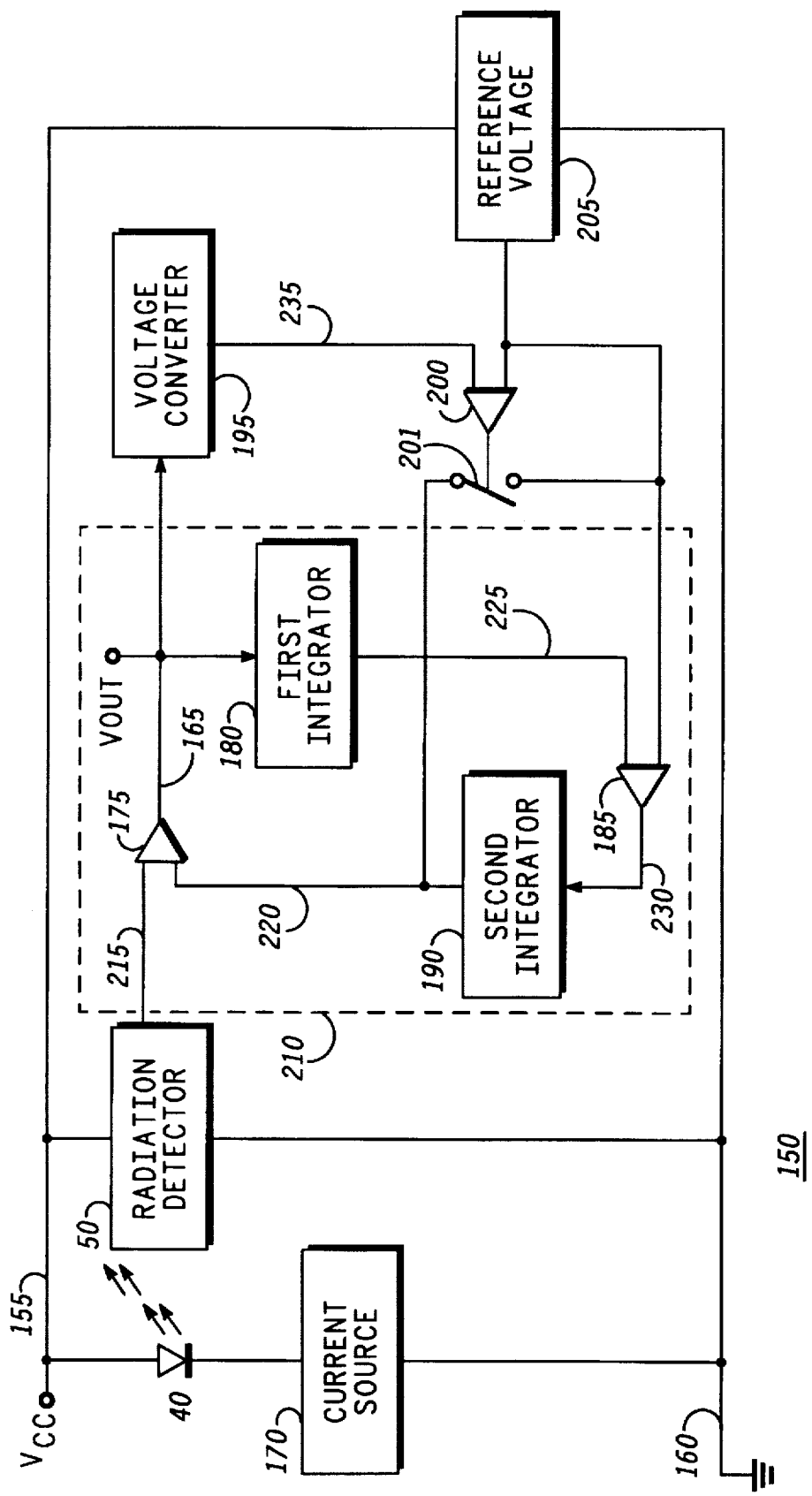
FIG. 5 shows a circuit diagram of an electrical circuit forming part of the preferred embodiment of FIG. 1.

Referring also to FIG. 5, an electrical arrangement 150 shows the circuit 60, the LED 40 and the radiation detector 50. The circuit 60 includes a duty cycle feedback loop 210, comprising first and second comparators 175 and 185 respectively and first and second integrators 180 and 190 respectively.

A current source 170 provides operating current for the LED 40. An output signal 215 received from the radiation detector 50 via the connection 55 is coupled to the first comparator 175 and compared to a signal 220 from the second integrator 190. The first comparator 175 is used to provide a logical squared output signal 165. The output signal 165 is integrated with the first integrator 180 to provide a mean value signal 225. The mean value signal 225 is compared with a constant reference voltage 205 by the second comparator 185. An output signal 230 of the second comparator 185 is integrated by the second integrator 190 to provide the signal 220.

A frequency to voltage converter 195 is used to convert a further portion of the signal 165 frequency into the voltage 235. The voltage 235 is compared to the reference voltage 205 by the comparator 200. With this arrangement when the signal 165 frequency is low, the voltage 235 is low and when it is lower than the reference voltage 205, the comparator 200 automatically switches off the duty cycle feedback loop and forces the threshold voltage 220 to a fixed value. The duty cycle feedback loop is switch back on when the voltage 235 is greater than the reference voltage 205.

A power supply terminal 155, a ground terminal 160 and an output voltage terminal coupled to receive the output voltage 165 are all housed in a connector 80, which provides connections to an external power supply and to a remote output unit (not shown) which converts the output signal into a suitable speed display.

In operation, rotation of the external drive shaft coupled to the square axle 15 gives rise to rotation of the rotatable shaft 20 about the axis 65. The slots 25 consequently produce alternate periods of interruption and transmission of the radiation along the radiation path 35 to the radiation detector 50, giving rise to a frequency of interruption, which is detected by the radiation detector 50 and indicates the speed of rotation of the rotatable shaft 20.

With this arrangement the signal 165 duty cycle is proportional to the constant reference voltage 205 regardless of the working conditions and environment (oil, temperature, pressure..) and component characteristics dispersion. Any change in the output signal 215 automatically produces a change in the signal 220 to maintain the same duty cycle at the output signal 165.

As described above, the comparator 200 automatically switches off the duty cycle feedback loop and forces the threshold voltage 220 to a fixed value when the output signal 165 has a very low frequency. This prevents any oscillations when the rotatable shaft 20 is turning very slowly, leading to accurate speed measurement for very slow speeds.

The perpendicular arrangement reduces degradation of the accuracy of the detection, because small rotations of the rotatable shaft 20 along the axis 65 with respect to the saddle 70 make substantially no difference to the interruption frequency.

It will be appreciated by a person skilled in the art that alternate embodiments to the one hereinbefore described are possible. For example, the housing could be fabricated from a material other plastic, and could be made from more than one piece.

Furthermore, the LED 40 could be of a type other than the Gallium Arsenide LED described above, and the radiation detector 50 would be replaced with a detector suitable for the type of LED chosen.

Moreover, the size and shape of the rotatable shaft 20 may be altered, and the metal collar 30 could be replaced by an alternative means for maintaining relative position between the rotatable shaft 20 and the saddle 70.

I claim:

1. A rotation sensor comprising:

a fixed member;

a radiation emitter disposed on the fixed member for emitting radiation along a path;

a rotatable member arranged to rotate about an axis substantially perpendicular to the path and comprising a head having slots therein and arranged in the path for periodically transmitting and blocking, in use, the radiation emitted by the emitter;

a radiation detector disposed on the fixed member for detecting radiation transmitted by the rotatable member; wherein rotational movement of the rotatable member with respect to the fixed member is sensed by the frequency of the radiation detected by the radiation detector; and an electronic circuit coupled to send and receive electrical signals to and from the emitter and the detector respectively, the electronic circuit including a duty cycle feedback loop comprising:

a first comparator having a first input coupled to an output of the radiation detector, a second input and an output, the first comparator for generating a logical squared output signal at its output; and a second comparator having a first input coupled to the output of the first comparator, a second input coupled to a reference voltage, and an output coupled to the second input of the first comparator, wherein, in use, the duty cycle feedback loop adjusts a duty cycle of the logical squared output signal so that the duty cycle has a predetermined value.

2. The rotation sensor of claim 1 wherein the the electronic circuit further comprises:

a frequency to voltage converter having an input coupled to the output of the first comparator and an output; and a third comparator having a first input coupled to the output of frequency to voltage converter, a second input coupled to the reference voltage and an output for coupling to the second input of the first comparator, wherein the duty cycle feedback loop is selectively coupled to the radiation detector depending on the output of the third comparator such that when the voltage signal at the output of the frequency to voltage converter is greater than the reference voltage, the duty cycle feedback loop is coupled to the radiation detector and when the voltage signal at the output of the frequency to voltage converter is less than the reference voltage, the duty cycle feedback loop is not coupled to the radiation detector.

3. The rotation sensor of claim 1 wherein the electronic circuit further comprises an output terminal coupled to the output of the first comparator for providing signals indicating the speed of rotation of the rotatable member.

4. The rotation sensor of claim 1 wherein the radiation emitter is a light emitting diode.

5. The rotation sensor of claim 1 wherein the fixed member further comprises a saddle enclosing the radiation emitter, the radiation detector, the path and the head of the rotatable member.

6. The rotation sensor of claim 1 wherein the slots are arranged perpendicular to the axis and are formed by radial apertures and radial wedges extending perpendicularly towards the axis.

\* \* \* \* \*